US009488752B2

(12) United States Patent
Rahman et al.

(10) Patent No.: US 9,488,752 B2
(45) Date of Patent: Nov. 8, 2016

(54) SYSTEM FOR COMPUTING THE RADIUS OF INVESTIGATION IN A RADIAL, COMPOSITE RESERVOIR SYSTEM

(71) Applicant: Saudi Arabian Oil Company, Dhahran (SA)

(72) Inventors: Noor M. Anisur Rahman, Dhahran (SA); Faisal M. Al-Thawad, Dhahran (SA); Saud A. BinAkresh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 563 days.

(21) Appl. No.: 13/909,234

(22) Filed: Jun. 4, 2013

(65) Prior Publication Data

US 2014/0358443 A1 Dec. 4, 2014

(51) Int. Cl.
*G01V 9/00* (2006.01)
*E21B 49/00* (2006.01)

(52) U.S. Cl.
CPC ............... *G01V 9/00* (2013.01); *E21B 49/00* (2013.01); *G01V 2210/66* (2013.01)

(58) Field of Classification Search
CPC .. G01V 9/00; G01V 2210/66; G01V 11/002; G01V 3/18; E21B 49/00
USPC ............................................. 702/6, 8; 175/61
See application file for complete search history.

(56) References Cited

FOREIGN PATENT DOCUMENTS

GB 2281971 A 3/1995

OTHER PUBLICATIONS

D. Bourdet: Well Test Analysis: "The Use of Advanced Interpretation Models" Jan. 1, 2002, Elsevier Science B.V., p. 194.
Fikri J. Kuchuk et al. "SPE 120515 Radius of Investigation for Reserve Estimation from Pressure Transient Well Tests" Jan. 1, 2009, pp. 1-3 amd 8-11.
F A Sobbi et al.: Radius of Investigation for Well Tests in Dual Porosity Reservoirs, Jan. 1, 1996, pp. 49-51.
Tim M. Whittle et al. The Determination of Minimum Tested Volume from the Deconvolution of Well Test Pressure Transients; SPE Annual Technical Conference and Exhibitiion, 1 J.

*Primary Examiner* — An Do
(74) *Attorney, Agent, or Firm* — Abelman, Frayne & Schwab

(57) ABSTRACT

A system for calculating the radius of investigation of a radial, composite reservoir has a processor with a clock, a display, and an electronic input coupled to the processor. The system divides the reservoir into a predetermined number (n) of concentric regions, and the processor is programmed to calculate periodically the radius of investigation based a starting time or elapsed time, and data relating to the reservoir rock, fluids, and geometries of each of the n regions. The processor computes the radius of investigation using at least one of Equations (1), (2), and (6) through (12) set forth in the specification, if using the System of U.S. Oilfield Units, or using an equivalent equation if using other units. These equations account for the effects of variations of both permeability and storativity in composite reservoirs on the radius of investigation with elapsed time.

13 Claims, 6 Drawing Sheets

| Hard-Coded Value - DO NOT CHANGE | Constant, C | 0.05669508 |

CASE: THREE-REGION COMPOSITE SYSTEM

Number of Concentric Regions, $n$     3

INPUT PARAMETERS

Total Compressibiilty in Region 1, $ct1$    1.00E-05   1/psi
Total Compressibiilty in Region 2, $ct2$    1.00E-05   1/psi
Total Compressibiilty in Region 3, $ct3$    1.00E-06   1/psi Porosity in Region 1, $\phi 1$    0.2
Porosity in Region 2, $\phi 2$    0.2
Porosity in Region 3, $\phi 3$    0.2

Permeability in Region 1, $k1$    100   md
Permeability in Region 2, $k2$    20   md
Permeability in Region 3, $k3$    100   md Viscosity of Fluid in Region 1, $\mu 1$    0.5   cp
Viscosity of Fluid in Region 2, $\mu 2$    0.5   cp
Viscosity of Fluid in Region 3, $\mu 3$    0.5   cp Boundary between Regions 1 and 2, $R1$    600 ft
Boundary between Regions 2 and 3, $R2$    1600 ft

| Elapsed Time, $\Delta t$ | 1000 hrs |

OUTPUT

Radius of Investigation, $ri3$    49326.6 ft

Figure 5

SYSTEM FOR COMPUTING THE RADIUS OF INVESTIGATION IN A RADIAL, COMPOSITE RESERVOIR SYSTEM

BACKGROUND OF THE INVENTION

The present invention is directed to the field of reservoir engineering, and is particularly applicable to petroleum reservoirs which are heterogeneous due to variations of permeability and porosity of the rock formation, and viscosity and compressibility of flowing fluids.

One common method for determining characteristics of a composite reservoir involves injecting fluids into, or withdrawing fluids from, an active, vertical well in order to create a pressure disturbance. Using parameters obtained from various sources such as well logs, well tests, and laboratory analyses of core and fluid samples, engineers can determine characteristics of the reservoir.

One of the parameters used as part of the analysis of the results of well tests is the "radius of investigation," also referred to as the "radius of drainage." The radius of investigation is the distance away from the starting location (where the well is located), at any given time, of the peak of the pressure disturbance. The radius investigation is an important parameter. For example, in order to analyze composite reservoir systems, petroleum engineers often need to estimate the radius of investigation for one, or a combination of, the following reasons:

1. To estimate the volume of influence while running transient well tests;
2. To optimize durations of transient tests in terms of sampling designated volumes;
3. To determine minimum reserves of fluids, including hydrocarbons;
4. To estimate the time to stabilization for a given well spacing;
5. To calculate the time when interference between two neighboring wells will be encountered; and
6. To find the locations of new wells to be drilled, hence to determine well spacing.

FIG. 1 shows schematically a radial composite reservoir, which has been divided into "n" radial regions located around the wellbore O. The boundaries between any two adjacent regions are designated with the corresponding radii. When a disturbance is created in the wellbore by initiating production and injection of fluid, i.e., at location O, a disturbance wave propagates radially outward toward the deep regions of the reservoir, from one concentric region to the next. The peak of the pressure disturbance is referred to as the "radius of investigation," or alternatively as the "radius of drainage." The radius of investigation is initially zero as long as there is no production or injection of fluid at the well. When a disturbance is created, the location of the radius of investigation moves radially outward at a rate dependent upon the isotropic properties of the rocks. Therefore, within the reservoir domain encircled by the location of the radius of investigation, there exists some detectable pressure gradient which affects the pressure behavior at the wellbore. The radius of investigation boundary expands with time and sweeps through the radially outward regions. FIG. 1 shows, for illustrative purposes, the location of the radius of investigation $r_{ij}$ at time $\Delta t$ (as indicated by one of the dotted circles).

Currently, petroleum engineers determine the radius of investigation by building a rigorous reservoir simulation model. Reservoir simulation models are reasonably accurate, but are time consuming and expensive to create and require developing software.

In "Well Test Analysis: The Use of Advanced Interpretation Models," D. Bourdet, Elsevier Science B.V., p. 194 (2002), the author proposes a well test analysis method using a simple formula to estimate the radius of investigation at any given time. The simple formula used, however, is capable of considering variations in permeability only, and for such reason may result in large errors, as high as 100% or more in the event where the porosity and the total system compressibility vary from one region to another. Thus, the simple formula method is not reliable for everyday use.

Two publications, "Estimation of Reservoir Properties Using Transient Pressure Data," D. W. Vasco, H. Keers, and K. Karasaki, Water Resources Research, Vol. 36, No. 12, pp. 3447-3465 (December 2000); and "A Streamline Approach for integrating Transient Pressure Data Into High-Resolution Reservoir Models," K. N. Kulkarni, A. Datta-Gupta, and D. W. Vasco, SPE Journal, pp. 273-282 (September 2001), show that a high-frequency solution to the "diffusivity formula" demonstrates that, during a propagation test, the speed of propagation is a function of the rock and fluid properties in the reservoir. These studies indeed validate the mathematical equations used in this invention.

SUMMARY OF THE INVENTION

The present invention is a system for calculating the radius of investigation of a radial, composite reservoir at a particular time. The system comprises a processor; a memory and, preferably, a clock electronically coupled to the processor; a display electronically coupled to the processor; and an electronic input coupled to the processor. The processor is programmed to calculate the radius of investigation, at any given time, in the reservoir based upon a plurality of user inputs including the number of concentric regions n into which the reservoir is to be divided, a starting time or elapsed time, and data relating to the reservoir rock, fluids, and geometries of each of the n regions. The processor computes the radius of investigation using at least one of Equations (1), (2) and (6) through (12) set forth hereafter, if using the System of U.S. Oilfield Units, or using an equivalent equation if using other units.

BRIEF DESCRIPTION OF THE DRAWINGS

FIG. 5 is an illustrative spread sheet display screen for the system; and

DETAILED DESCRIPTION OF THE INVENTION

Figure 1:
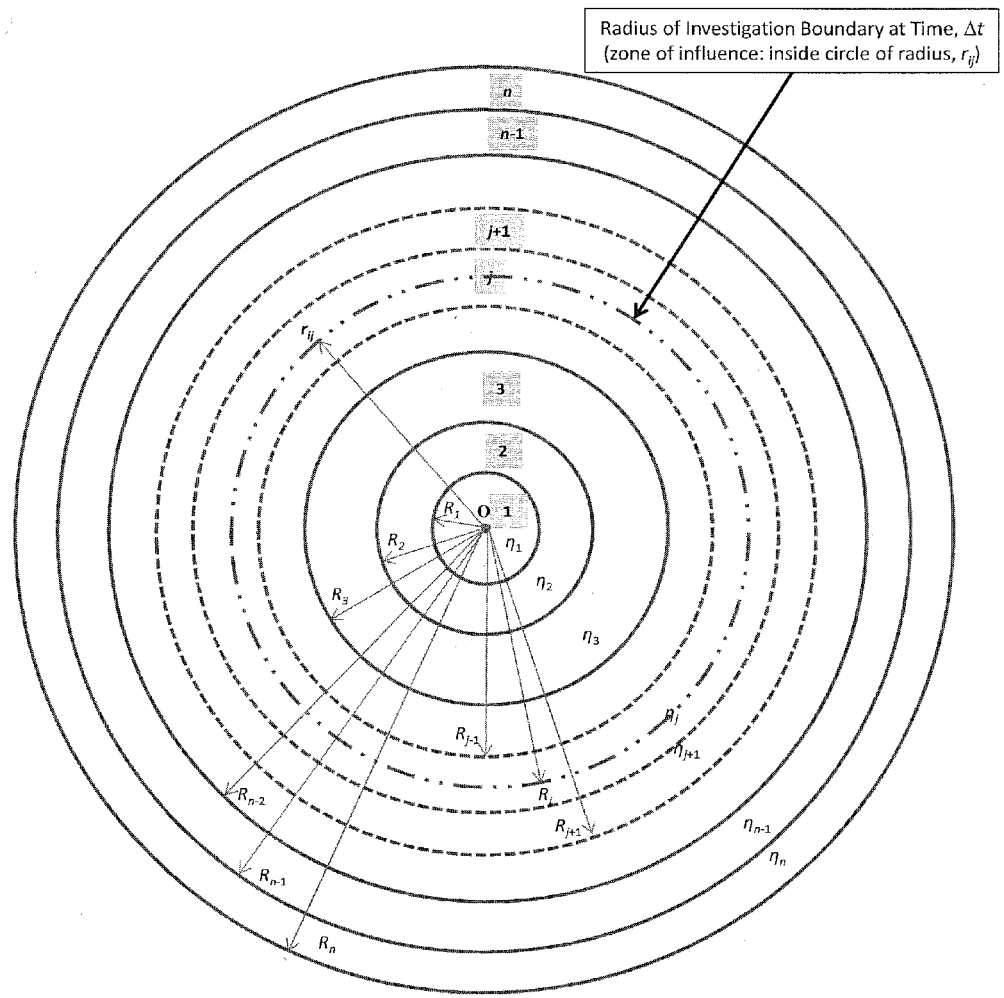
FIG. 1 is a schematic, aerial view of a composite reservoir divided into a number of radially-concentric regions.

FIG. 1 schematically shows the mechanism of reservoir fluid flow when pressurized fluid is introduced into a vertical active well at location O. In FIG. 1, the reservoir has been divided into a number of concentric regions (n), where the $j^{th}$ region hosts the perimeter with a radius of $r_{ij}$ to signify the radius of investigation at time Δt. Each region, for example, region 2, is separated from the adjacent regions, regions 1 and 3, by boundaries, in this example, at radii $R_1$ and $R_2$. Similarly, the $j^{th}$ region, arbitrarily illustrated for hosting the radius of investigation at time Δt, is demarcated by two similar dotted circles with radii $R_{j-1}$ and $R_j$. Each region has distinct rock and fluid properties such as permeability, porosity, and compressibility, which may be determined using known methods. Characteristic properties of rock and fluid change from one region to another region either due to the geological heterogeneity of the rock or to the properties (e.g., viscosity, compressibility) of the fluids produced or injected. Each of the n regions is bounded by two concentric circles, which replicate physical demarcation of changes in properties of the rock and the fluid between two adjacent regions. If sufficient time elapses, the radius of investigation can eventually reach the outermost region (the $n^{th}$ region) and can be equal to $R_n$ (the location of the extreme boundary of the composite reservoir system) as an extreme case.

As part of planning for reservoir testing, engineers will determine the number of concentric regions n in which to divide the reservoir based on the physical data from the sources available to them. Sometimes engineers build their own reservoir models with n concentric regions utilizing data from pressure-transient tests. Also there are times when engineers get the reservoirs already described from simulation or geological models.

As noted previously, in the past engineers were required to design rigorous models in order to be able estimate accurately the radius of investigation at a specified time. The inventors herein have derived, using a high-frequency solution of the diffusivity equation, a mathematical formula to determine the radius of investigation around a vertical well in composite systems, which formula is very rigorous. The formula may be used for any number of radial regions around the wellbore. The formula may be programmed into any processor-based system, such as a small calculator, tablet, laptop, or the like, to compute the radius of investigation almost instantly and accurately. Preferably, such formula is used with the processor running a spreadsheet program. Input parameters may be displayed in the spreadsheet, along with the radius of investigation calculated by the processor using the formula.

Such formula can be expressed in a number of different equation formats. In one format, for a given composite reservoir system for which the rock and fluid properties have been determined, the radius of investigation $r_{ij}$ can be calculated with the following equation:

$$r_{ij} = \sqrt{\eta_j}\left[\sum_{l=1}^{j-2} R_l\left(\frac{1}{\sqrt{\eta_{l+1}}} - \frac{1}{\sqrt{\eta_l}}\right)\right] + R_{j-1}\left(1 - \sqrt{\frac{\eta_j}{\eta_{j-1}}}\right) + C\sqrt{\eta_j \Delta t} \quad (1)$$

where:

$r_{ij}$ is the radius of investigation (ft.) which is located in the $j^{th}$ concentric region;

η is the total number of concentric regions in a composite system;

$\eta_j$ is the hydraulic diffusivity in the $j^{th}$ concentric region, determined by equation (3) below;

$R_j$ is the location of the boundary between the $j^{th}$ and the $(j+1)^{th}$ concentric regions;

j is an arbitrary region (the boundary of the region of influence is located in the $j^{th}$ region;

$\eta_I$ and $\eta_{I+1}$ are the hydraulic diffusivities in the $I^{th}$ and $(I+1)^{th}$ concentric regions;

I is an indexing (also known as dummy) variable, which is temporarily utilized while performing the calculations in the summation loop in Equation (1);

$R_{j-1}$ is the location of the boundary between the $(j-1)^{th}$ and the $j^{th}$ concentric regions;

$\eta_{j-1}$ is the hydraulic diffusivity in the $(j-1)^{th}$ region;

C is a constant (0.0566950796 in the case of the System of Oilfield Units); and

Δt is the elapsed time in hours since the disturbance has been initiated at the well due to production or injection.

Equation (1) is valid when the pressure transient has reached the $j^{th}$ region of an n-region, composite system at the elapsed time, Δt. The $j^{th}$ region is located between the concentric boundaries at $R_{j-1}$ and $R_j$. As the geometrical boundaries between adjacent regions are defined by the concentric circular cylinders with radii of $R_1, R_2, R_3, \ldots R_j$, $R_{j+1}, \ldots R_n$, there is no additional resistance to fluid movement beyond sharp changes in rock and fluid properties. Note that j≤n.

A detailed procedure (Methods 1 and 2) is presented later on how to determine if the location of the boundary of the radius of investigation at the elapsed time Δt is actually the $j^{th}$ region. The foregoing Equation (1), as well as the remaining equations herein, are based on the U.S. Oilfield Units, and may easily be converted into other units. Also, the constant C is given in U.S. Oilfield Units. The constant C has been determined to satisfy the condition that 99 percent of cumulative production or injection through the active wellbore at location O is being contributed by, or drawn from, the entire region within the radius of investigation if the well is in production or injection.

A long form of Equation (1) can be expressed as:

$$r_{ij} = \sqrt{\eta_j}\left[R_1\left(\frac{1}{\sqrt{\eta_2}} - \frac{1}{\sqrt{\eta_1}}\right) + R_2\left(\frac{1}{\sqrt{\eta_3}} - \frac{1}{\sqrt{\eta_2}}\right) + \ldots + \right. \quad (2)$$
$$\left. R_{j-2}\left(\frac{1}{\sqrt{\eta_{j-1}}} - \frac{1}{\sqrt{\eta_{j-2}}}\right)\right] + R_{j-1}\left(1 - \sqrt{\frac{\eta_j}{\eta_{j-1}}}\right) + C\sqrt{\eta_j \Delta t}$$

where $$\eta_j = \frac{k_j}{\phi_j \mu_j c_{tj}} = \frac{M_j}{F_j} \quad (3)$$

$$M_j = \frac{k_j}{\mu_j} \quad (4)$$

$$F_j = \phi_j c_{tj} \quad (5)$$

$\eta_1$, $\eta_2$ and $\eta_3$ are the hydraulic diffusivities in the $1^{st}$, $2^{nd}$ and $3^{rd}$ concentric regions;

$M_j$ is the fluid mobility in the $j^{th}$ concentric region;

$\phi_j$ is the porosity of reservoir rock in the $j^{th}$ concentric region;

$\mu_j$ is the viscosity of the fluid in the $j^{th}$ concentric region;

$k_j$ is the reservoir permeability in the $j^{th}$ concentric region;

$F_j$ is the fluid storativity in the $j^{th}$ concentric region; and $c_{tj}$ is the total system compressibility in the $j^{th}$ concentric region.

Equations (3) through (5) can be used in calculating mobility, storativity, and hydraulic diffusivity of each region from a given set of rock and fluid properties in the composite system. Equations (1) and (2) can be expressed in terms of the mobility and storativity of individual regions, and are presented in the respective order as:

$$r_{ij} = \sqrt{\frac{M_j}{F_j}} \left[ \sum_{I=1}^{j-2} R_I \left( \sqrt{\frac{F_{I+1}}{M_{I+1}}} - \sqrt{\frac{F_I}{M_I}} \right) \right] + \quad (6)$$

$$R_{j-1}\left(1 - \sqrt{\frac{M_j}{F_j}\frac{F_{j-1}}{M_{j-1}}}\right) + C\sqrt{\frac{M_j \Delta t}{F_j}}$$

$$r_{ij} = \sqrt{\frac{M_j}{F_j}} \left[ R_1 \left( \sqrt{\frac{F_2}{M_2}} - \sqrt{\frac{F_1}{M_1}} \right) + \quad (7) \right.$$

$$\left. R_2 \left( \sqrt{\frac{F_3}{M_3}} - \sqrt{\frac{F_2}{M_2}} \right) + \ldots + R_{j-2}\left( \sqrt{\frac{F_{j-1}}{M_{j-1}}} - \sqrt{\frac{F_{j-2}}{M_{j-2}}} \right) \right] +$$

$$R_{j-1}\left(1 - \sqrt{\frac{M_j}{F_j}\frac{F_{j-1}}{M_{j-1}}}\right) + C\sqrt{\frac{M_j \Delta t}{F_j}}$$

Each of Equations (1), (2), (6), and (7) allows an engineer to calculate the radius of investigation in a radial composite reservoir system at a given elapsed time. As all these equations are identical, the engineer may choose any of these to perform the calculations. As indicated in the equations, the value of the radius of investigation depends not only on the rock and fluid properties of the swept regions and their geometric parameters (concentric radii) within the region of investigation boundary, but also on the location of the radius investigation boundary at the elapsed time. Therefore, some cyclic efforts are necessary to determine which region the radius investigation boundary is located in order to calculate the region of investigation value at that time, which is discussed later under Method 1.

The following are some special cases of the general equations (1), (2), (6), and (7) to illustrate how such equations apply under special circumstances:

When the location of the boundary of the radius of investigation is located in region 1, the radius of investigation can be estimated from:

$$r_{i1} = C\sqrt{\eta_1 \Delta t} = C\sqrt{\frac{M_1 \Delta t}{F_1}} \quad (8)$$

When the location of the boundary of the radius of investigation is located in region 2, the radius of investigation can be estimated from:

$$r_{i2} = R_1\left(1 - \sqrt{\frac{\eta_2}{\eta_1}}\right) + C\sqrt{\eta_2 \Delta t} = R_1\left(1 - \sqrt{\frac{M_2}{F_2}\frac{F_1}{M_1}}\right) + C\sqrt{\frac{M_2 \Delta t}{2}} \quad (9)$$

When the location of the boundary of the radius of investigation is located in region 3, the radius of investigation can be estimated from:

$$r_{i3} = R_1\sqrt{\eta_3}\left(\frac{1}{\sqrt{\eta_2}} - \frac{1}{\sqrt{\eta_1}}\right) + R_2\left(1 - \sqrt{\frac{\eta_3}{\eta_2}}\right) + C\sqrt{\eta_3 \Delta t} = \quad (10)$$

$$R_1\sqrt{\frac{M_3}{F_3}}\left(\sqrt{\frac{F_2}{M_2}} - \sqrt{\frac{F_1}{M_1}}\right) + R_2\left(1 - \sqrt{\frac{M_3}{F_3}\frac{F_2}{M_2}}\right) + C\sqrt{\frac{M_3 \Delta t}{F_3}}$$

When the location of the boundary of the radius of investigation is located in region 4, the radius of investigation can be estimated from:

$$r_{i4} = \sqrt{\eta_4}\left[R_1\left(\frac{1}{\sqrt{\eta_2}} - \frac{1}{\sqrt{\eta_1}}\right) + R_2\left(\frac{1}{\sqrt{\eta_3}} - \frac{1}{\sqrt{\eta_2}}\right)\right] + \quad (11)$$

$$R_3\left(1 - \sqrt{\frac{\eta_4}{\eta_3}}\right) + C\sqrt{\eta_4 \Delta t} =$$

$$\sqrt{\frac{M_3}{F_3}}\left[R_1\left(\sqrt{\frac{F_2}{M_2}} - \sqrt{\frac{F_1}{M_1}}\right) + R_2\left(\sqrt{\frac{F_3}{M_3}} - \sqrt{\frac{F_2}{M_2}}\right)\right] +$$

$$R_3\left(1 - \sqrt{\frac{M_4}{F_4}\frac{F_3}{M_3}}\right) + C\sqrt{\frac{M_4 \Delta t}{F_4}}$$

Notice that a mathematical pattern has developed starting from Equation (8) through (11) corresponding to region 1 through 4. This means that one can follow this pattern to write down the equation for the situation when the boundary of the radius of investigation is located in any region beyond region 4 within a composite system with n regions. Thus, following this pattern, one can express an expanded version of equation (1), (2), (6) or (7) for determining the radius of investigation when the boundary is located anywhere within a composite system. We note that Equation (8) is applicable for a single region, homogeneous system with rock and fluid properties identical to region 1 of the general case presented.

The time required to reach each region can be estimated from inverse versions of the general Equations (1) through (11). A general expression for making such calculation is presented in Equation (12) below:

$$\Delta T_{R_j} = \frac{1}{C^2}\left[\frac{R_1}{\sqrt{\eta_1}} + \sum_{I=2}^{j}\frac{R_I - R_{I-1}}{\sqrt{\eta_I}}\right]^2 = \quad (12)$$

$$\frac{1}{C^2}\left[R_1\sqrt{\frac{F_1}{M_1}} + \sum_{I=2}^{j}\left\{(R_I - R_{I-1})\sqrt{\frac{F_I}{M_I}}\right\}\right]^2$$

where:

$\Delta T_{Rj}$ is the time required to include regions between the well and the inter-region boundary at $R_j$ under the zone of influence, hours. This means that the radius of investigation is $R_j$ when the elapsed time is $\Delta T_{Rj}$.

The System and Its Operation

Figure 2:
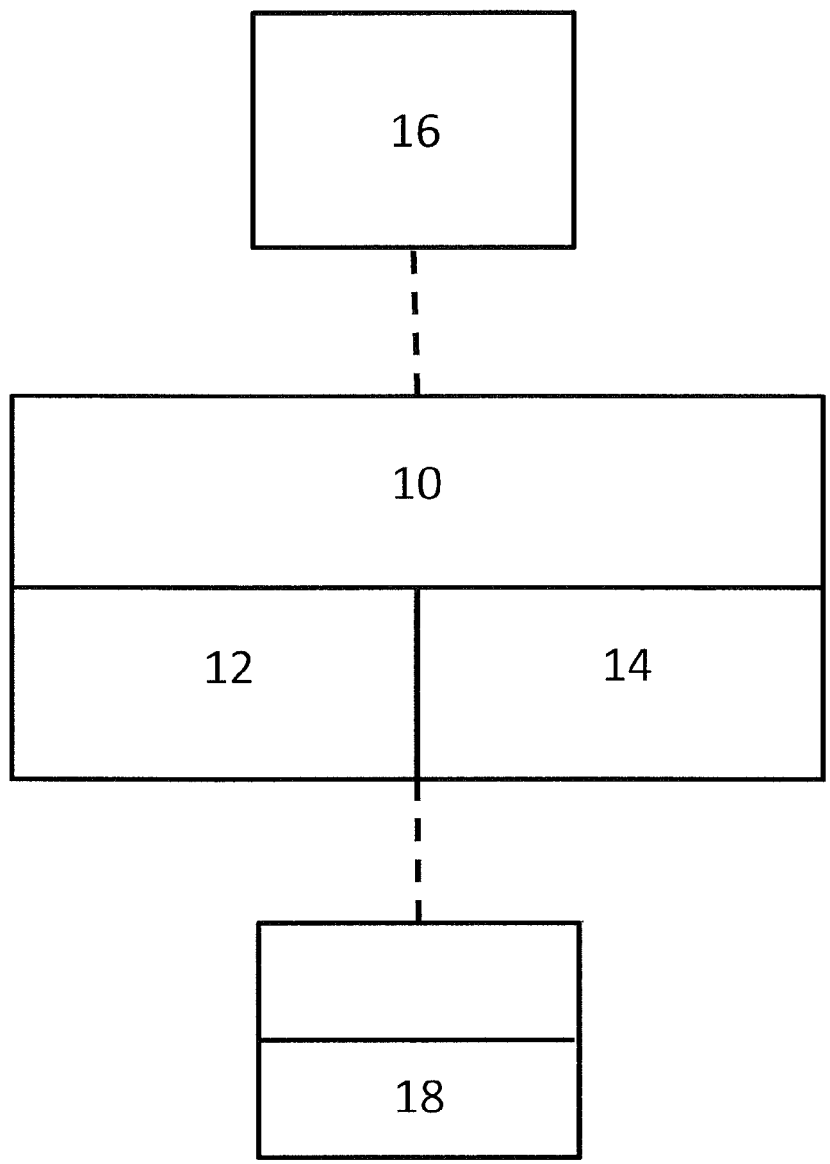
FIG. 2 is a schematic representation of the system according to the invention.

Referring to FIG. 2, an example of the invention is a system which includes a unit having a processor 10, memory 12, and a clock 14. The unit is connected to a video display 16 and an input 18, which may be in the form of a keyboard. Alternatively, the video display 16 may include a touch screen to serve as the input. Software representing at least one of Equations (1) or its various other forms, as set forth in Equations (2) and (6) through (12) is stored in memory 12 and used by the processor 10 to calculate and display on the display 16 the radius of investigation based upon inputs described above, which are available to reservoir engineers from conventional sources.

There are three steps in calculating the radius of investigation for a given composite reservoir system:

(1) gather input parameters relating to the reservoir rock, fluids, and geometries of each of the n regions;

(2) for an elapsed time Δt, determine in which region the boundary of the radius of investigation is located by employing either Method 1 or Method 2 (described later);

(3) calculate the value of the radius investigation with one of the general equations (1, 2, 6, or 7), whose boundary location has been confirmed.

In particular, once all the rock and fluid properties (permeability, porosity, total compressibility, fluid viscosity, and geometric boundaries of each region) are known, one needs to know which region hosts the boundary of the radius of investigation. Hence of two following methods, as described below, may be employed to ascertain the location.

Method 1

Figure 3:
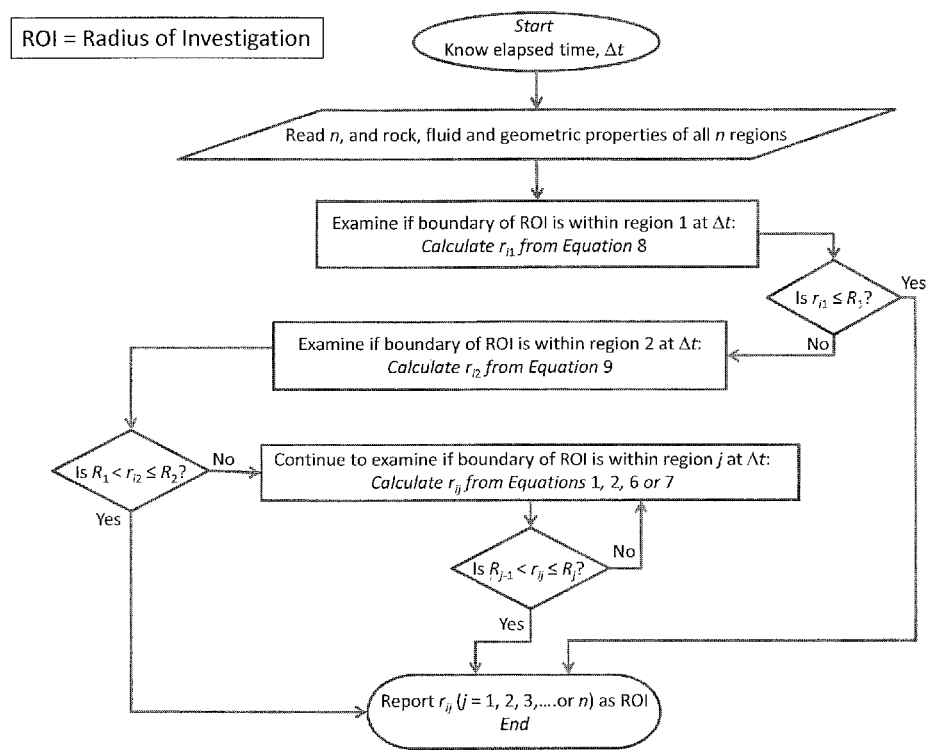
FIG. 3 is a flow diagram of a first method which may be carried out by the system processor to determine the radius of investigation at a specific time.

One method which may be employed is illustrated in FIG. 3. With such a method, preferably the location of the radius of investigation boundary is simultaneously checked as part of a trial and error effort. The trial starts progressively from region 1 (then region 2, then region 3, and so on) until a consistency is established between the radius of investigation and the location of the boundary of the region. In other words, an engineer first assumes that the radius of investigation is in region 1. Then, using the foregoing equations, the engineer determines whether the calculated value of the radius of investigation is less than or equal to the physical outer boundary of Region 1, which is $R_2$.

If the calculated value is greater than $R_2$, the engineer then assumes that the radius of investigation is in region 2 and re-calculates the radius of investigation. If the calculated value is greater the physical outer boundary of Region 2, which is R3, the engineer assumes that the radius of investigation is in region 3, and re-calculates the value, and so on. Once the region which is assumed to be hosting the radius of investigation boundary is confirmed, this final value of $r_{ij}$ as found in the end is accepted as the radius of investigation for the elapsed time.

Method 2

Figure 4:
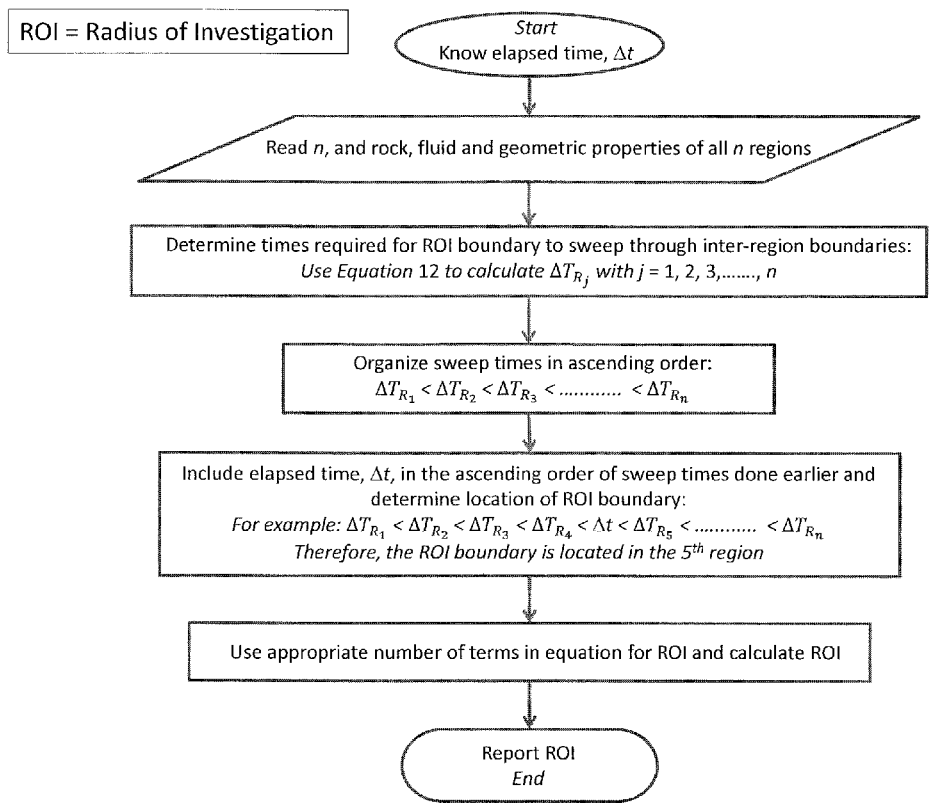
FIG. 4 is a flow diagram of a second method which may be carried out by the system processor to determine the radius of investigation at a specific time.

A second method for performing the calculations is illustrated in the flow diagram of FIG. 4. With this method, it is recommended that the times required to sweep each inter-region boundary be calculated a priori by using Equation (12). Thus one has a set of elapsed times which are required for the radii of investigation to be the corresponding outer boundaries of the regions. The elapsed time must fall in between the estimated times from Equation (12). It then becomes easy to identify the location of the region of investigation boundary (the $j^{th}$ region) for an elapsed time, which allows one to include the right number of terms for calculating the radius of investigation. Because knowing the value of j allows one to decide how many terms are required in Equation 1, 2, 6 or 7 for performing the calculations.

Presentation of Cases

FIG. 5 shows an example of an Excel spreadsheet which is generated on a display with software implementing Equation (10). In the example, the composite reservoir system has three regions. The displayed value of the radius of investigation changes with time, and also is updated as soon as any of the values of the reservoir or fluid parameters are changed. While three regions have been used for illustrative purposes, the software can be utilized for any number of regions. In order to test the accuracy of the present invention, a comparison was made between values of radius of investigation determined from a rigorous model and the values determined using the present invention. The reservoir was a three-region composite reservoir tested for an elapsed time of 1,000 hours. Table 1 lists the input parameters:

TABLE 1

| Case | Permeability, md | Porosity, fraction | Total Compressibility, $10^{-6}$ psi$^{-1}$ | Fluid Viscosity, cp |
|---|---|---|---|---|
| I | $k_1 = 100, k_2 = 20, k_3 = 100$ | $\phi_1 = \phi_2 = \phi_3 = 0.2$ | $c_{t1} = 10, c_{t2} = 10, c_{t3} = 10$ | $\mu_1 = 0.5$ |
| II | $k_1 = 100, k_2 = 20, k_3 = 100$ | $\phi_1 = \phi_2 = \phi_3 = 0.2$ | $c_{t1} = 10, c_{t2} = 10, c_{t3} = 1$ | $\mu_2 = 0.5$ |
| III | $k_1 = 100, k_2 = 20, k_3 = 100$ | $\phi_1 = \phi_2 = \phi_3 = 0.2$ | $c_{t1} = 10, c_{t2} = 1, c_{t3} = 10$ | $\mu_3 = 0.5$ |
| IV | $k_1 = 50, k_2 = 100, k_3 = 50$ | $\phi_1 = \phi_2 = \phi_3 = 0.2$ | $c_{t1} = 1, c_{t2} = 10, c_{t3} = 10$ | |
| V | $k_1 = 200, k_2 = 300, k_3 = 600$ | $\phi_1 = \phi_2 = \phi_3 = 0.2$ | $c_{t1} = 1, c_{t2} = 10, c_{t3} = 10$ | |
| VI | $k_1 = 50, k_2 = 100, k_3 = 200$ | $\phi_1 = \phi_2 = \phi_3 = 0.2$ | $c_{t1} = 1, c_{t2} = 10, c_{t3} = 10$ | |

Figure 6:
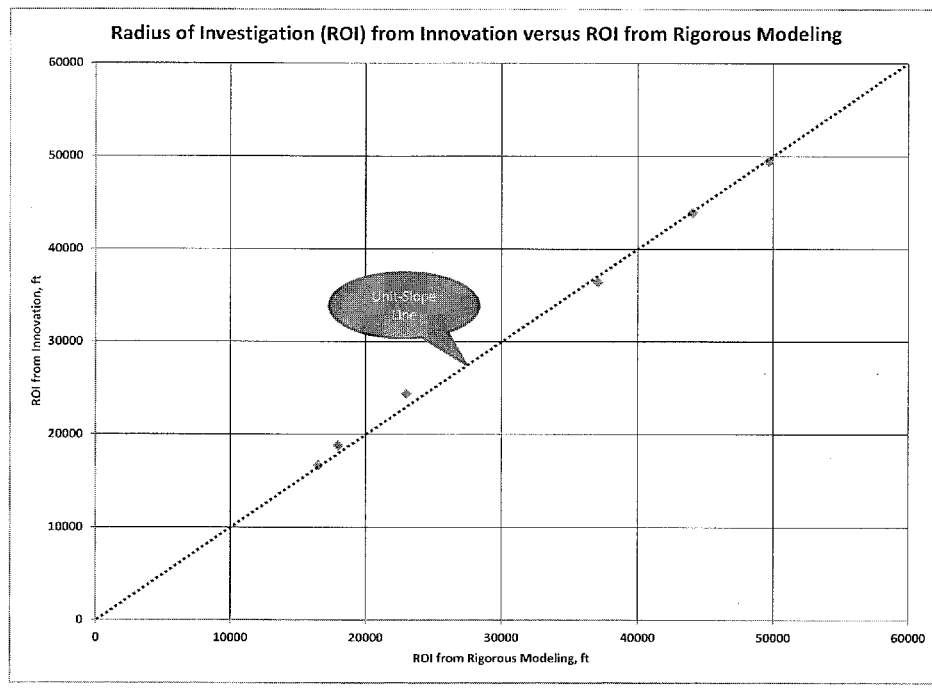
FIG. 6 is a chart comparing results from using the present invention against a rigorous reservoir simulation model.

FIG. 6 illustrates the radius of investigation, shown as a solid line, predicted by the rigorous model, as compared with six data points calculated by the equations of the present invention. As FIG. 6 shows, the present invention accurately predicted the values of the radius of investigation in each case.

The foregoing description represents the preferred embodiments of the invention. Various modifications will be apparent to persons skilled in the art. For example, all of the equations in this specification are in the System of U.S. Oilfield Units. Such equations may easily be converted to other systems of units. In the following claims, any formula specified is deemed to include equivalent formulas on other Units. All other such modifications and variations are intended to be within the scope of the claimed invention.

The foregoing portion of the specification includes twelve equations, which are numbered (1) through (12). When the following claims refer to equations (1), (2), and (6) through (12), such claims are referring to the equations correspondingly numbered in the specification.

The invention claimed is:

1. A system for calculating the radius of investigation of a radial, composite reservoir, said system comprising:

a processor, a memory electronically coupled to said processor, a clock for providing a starting time and an elapsed time to the processor, a display electronically coupled to said processor, and an electronic input, coupled to said processor, for entering data;

wherein said processor is programmed (a) to divide the reservoir into a predetermined number (n) of concentric regions;

(b) to store in memory, for each region (n), data relating to the reservoir rock, fluids, and geometries of each of the n regions; and (c) to calculate the current radius of investigation in the reservoir for a plurality of selected regions (n) based upon the stored data for each such region (n) and a starting elapsed time, using at least one of Equations (1), (2), and (6) through (12) as expressed in the following:

$$r_{ij} = \sqrt{\eta_j} \left[ \sum_{l=1}^{j-2} R_l \left( \frac{1}{\sqrt{\eta_{l+1}}} - \frac{1}{\sqrt{\eta_l}} \right) \right] + R_{j-1} \left( 1 - \sqrt{\frac{\eta_j}{\eta_{j-1}}} \right) + C\sqrt{\eta_j \Delta t} \quad (1)$$

where:
- $r_{ij}$ is the radius of investigation (ft.) which is located in the $j^{th}$ concentric region;
- $\eta$ is the total number of concentric regions in a composite system;
- $\eta_j$ is the hydraulic diffusivity in the $j^{th}$ concentric region, determined by equation (3) below;
- $R_j$ is the location of the boundary between the $j^{th}$ and the $(j+1)^{th}$ concentric regions;
- j is an arbitrary region (the boundary of the region of influence is located in the $j^{th}$ region;
- $\eta_l$ and $\eta_{l+1}$ are the hydraulic diffusivities in the $l^{th}$ and $(l+1)^{th}$ concentric regions;
- l is an indexing (also known as dummy) variable, which is temporarily utilized while performing the calculations in the summation loop in Equation (1);
- $R_{j-1}$ is the location of the boundary between the $(j-l)^{th}$ and the $j^{th}$ concentric regions;
- $\eta_{j-1}$ is the hydraulic diffusivity in the $(j-l)^{th}$ region;
- C is a constant (0.0566950796 in the case of the System of Oilfield Units); and
- $\Delta t$ is the elapsed time in hours since the disturbance has been initiated at the well due to production or injection

OR $$r_{ij} = \sqrt{\eta_j} \left[ R_1 \left( \frac{1}{\sqrt{\eta_2}} - \frac{1}{\sqrt{\eta_1}} \right) + R_2 \left( \frac{1}{\sqrt{\eta_3}} - \frac{1}{\sqrt{\eta_2}} \right) + \ldots + R_{j-2} \left( \frac{1}{\sqrt{\eta_{j-1}}} - \frac{1}{\sqrt{\eta_{j-2}}} \right) \right] + R_{j-1} \left( 1 - \sqrt{\frac{\eta_j}{\eta_{j-1}}} \right) + C\sqrt{\eta_j \Delta t} \quad (2)$$

OR $$r_{i,j} = \sqrt{\frac{M_j}{F_j}} \left[ \sum_{l=1}^{j-2} R_l \left( \sqrt{\frac{F_{l+1}}{F_{l+1}}} - \sqrt{\frac{F_l}{M_l}} \right) \right] + R_{j-1} \left( 1 - \sqrt{\frac{M_j}{F_j} \frac{F_{j-1}}{M_{j-1}}} \right) + C\sqrt{\frac{M_j \Delta t}{F_j}} \quad (6)$$

OR $$r_{i,j} = \sqrt{\frac{M_j}{F_j}} \left[ R_1 \left( \sqrt{\frac{F_2}{M_2}} - \sqrt{\frac{F_1}{M_1}} \right) + R_2 \left( \sqrt{\frac{F_3}{M_3}} - \sqrt{\frac{F_2}{M_2}} \right) + \ldots + R_{j-2} \left( \sqrt{\frac{F_{j-1}}{M_{j-1}}} - \sqrt{\frac{F_{j-2}}{M_{j-2}}} \right) \right] + R_{j-1} \left( 1 - \sqrt{\frac{M_j}{F_j} \frac{F_{j-1}}{M_{j-1}}} \right) + C\sqrt{\frac{M_j \Delta t}{F_j}} \quad (7)$$

OR $$r_{i1} = C\sqrt{\eta_1 \Delta t} = C\sqrt{\frac{M_1 \Delta t}{F_1}} \quad (8)$$

OR $$r_{i2} = R_1 \left( 1 - \sqrt{\frac{\eta_2}{\eta_1}} \right) + C\sqrt{\eta_2 \Delta t} = R_1 \left( 1 - \sqrt{\frac{M_2}{F_2} \frac{F_1}{M_1}} \right) + C\sqrt{\frac{M_2 \Delta t}{F_2}} \quad (9)$$

OR $$r_{i3} = R_1 \sqrt{\eta_3} \left( \frac{1}{\sqrt{\eta_2}} - \frac{1}{\sqrt{\eta_1}} \right) + R_2 \left( 1 - \sqrt{\frac{\eta_3}{\eta_2}} \right) + C\sqrt{\eta_3 \Delta t} \quad (10)$$

$$= R_1 \sqrt{\frac{M_3}{F_3}} \left( \sqrt{\frac{F_2}{M_2}} - \sqrt{\frac{F_1}{M_1}} \right) + R_2 \left( 1 - \sqrt{\frac{M_3}{F_3} \frac{F_2}{M_2}} \right) + C\sqrt{\frac{M_3 \Delta t}{F_3}}$$

OR $$r_{i4} = \sqrt{\eta_4} \left[ R_1 \left( \frac{1}{\sqrt{\eta_2}} - \frac{1}{\sqrt{\eta_1}} \right) + R_2 \left( \frac{1}{\sqrt{\eta_3}} - \frac{1}{\sqrt{\eta_2}} \right) \right] + R_3 \left( 1 - \sqrt{\frac{\eta_4}{\eta_3}} \right) + C\sqrt{\eta_4 \Delta t} \quad (11)$$

$$= \sqrt{\frac{M_3}{F_3}} \left[ R_1 \left( \sqrt{\frac{F_2}{M_2}} - \sqrt{\frac{F_1}{M_1}} \right) + R_2 \left( \sqrt{\frac{F_3}{M_3}} - \sqrt{\frac{F_2}{M_2}} \right) \right] + R_3 \left( 1 - \sqrt{\frac{M_4}{F_4} \frac{F_3}{M_3}} \right) + C\sqrt{\frac{M_4 \Delta t}{F_4}}$$

OR $$\Delta T_{R_j} = \frac{1}{C^2} \left[ \frac{R_1}{\sqrt{\eta_1}} + \sum_{l=2}^{j} \frac{R_l - R_{l-1}}{\sqrt{\eta_l}} \right]^2 = \frac{1}{C^2} \left[ R_1 \sqrt{\frac{F_1}{M_1}} + \sum_{l=2}^{j} \left\{ (R_l - R_{l-1}) \sqrt{\frac{F_l}{M_l}} \right\} \right]. \quad (12)$$

2. The system of claim 1, wherein the processor is programmed to use at least Equation (1).

3. The system of claim 1, wherein the processor is programmed to use at least Equation (2).

4. The system of claim 1, wherein the processor is programmed to use at least Equation (6).

5. The system of claim 1, wherein the processor is programmed to use at least Equation (7).

6. The system of claim 1, wherein the processor is programmed to use at least Equation (8).

7. The system of claim 1, wherein the processor is programmed to use at least Equation (9).

8. The system of claim 1, wherein the processor is programmed to use at least Equation (10).

9. The system of claim 1, wherein the processor is programmed to use at least Equation (11).

10. The system of claim 1, wherein the processor is programmed to use at least Equation (12).

11. The system of claim 1, wherein the processor is programmed to use at least two of the Equations (1), (2), and (6) through (12), and wherein the input allows an operator the option to choose which equation is to be used.

12. The system of claim 1, wherein the processor is programmed:
- to determine whether the boundary of the radius of investigation is within region 1 at a given time using equation (8);
- if yes, reporting the calculated radius of investigation as the final radius of investigation;
- if no, determining whether the boundary of the radius of investigation is within region 2 using equation (9);
- if yes, reporting the calculated radius of investigation as the final radius of investigation;
- if no, continuing to determine whether the calculated radius of investigation is within sequentially increasing regions.

13. The system of claim 1, wherein the processor is programmed to calculate and display the time required for the boundary of the radius of investigation to reach each outer region boundary using equation (12).

\* \* \* \* \*